April 1, 1952 — C. J. LIND — 2,591,564
MOLDING AND ASSEMBLING METHOD AND APPARATUS
Filed March 18, 1950 — 3 Sheets-Sheet 1
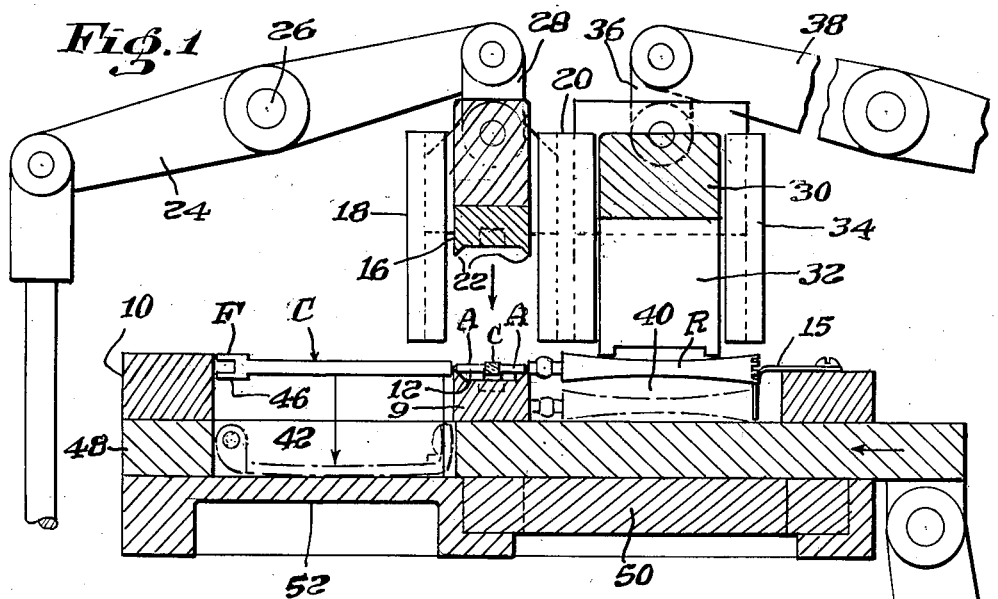
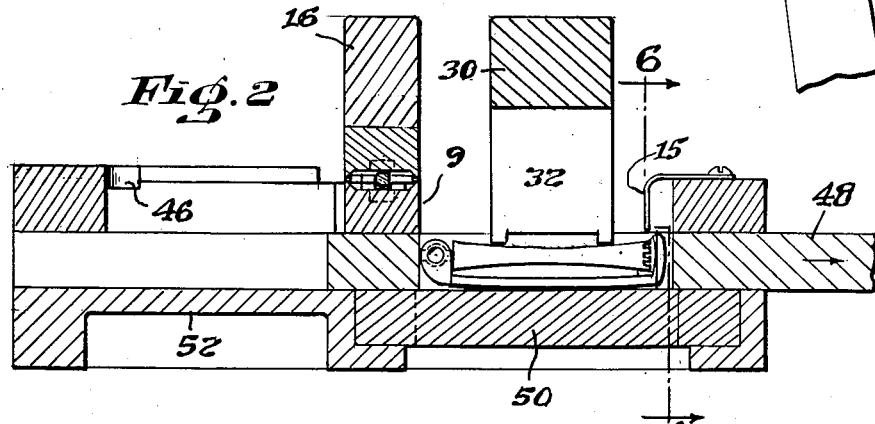
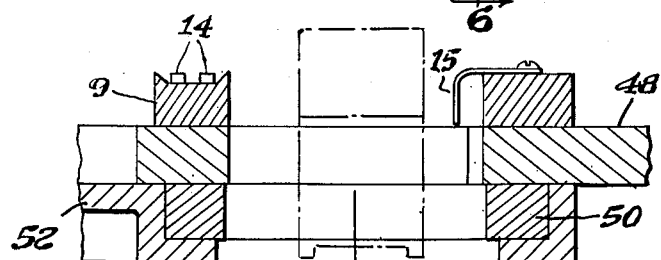
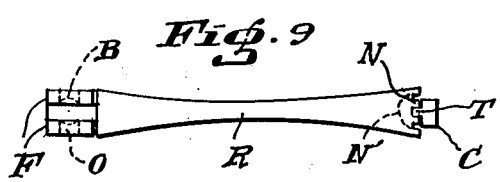
INVENTOR
CARL J. LIND
BY ATTORNEY April 1, 1952 C. J. LIND 2,591,564
MOLDING AND ASSEMBLING METHOD AND APPARATUS
Filed March 18, 1950 3 Sheets-Sheet 2
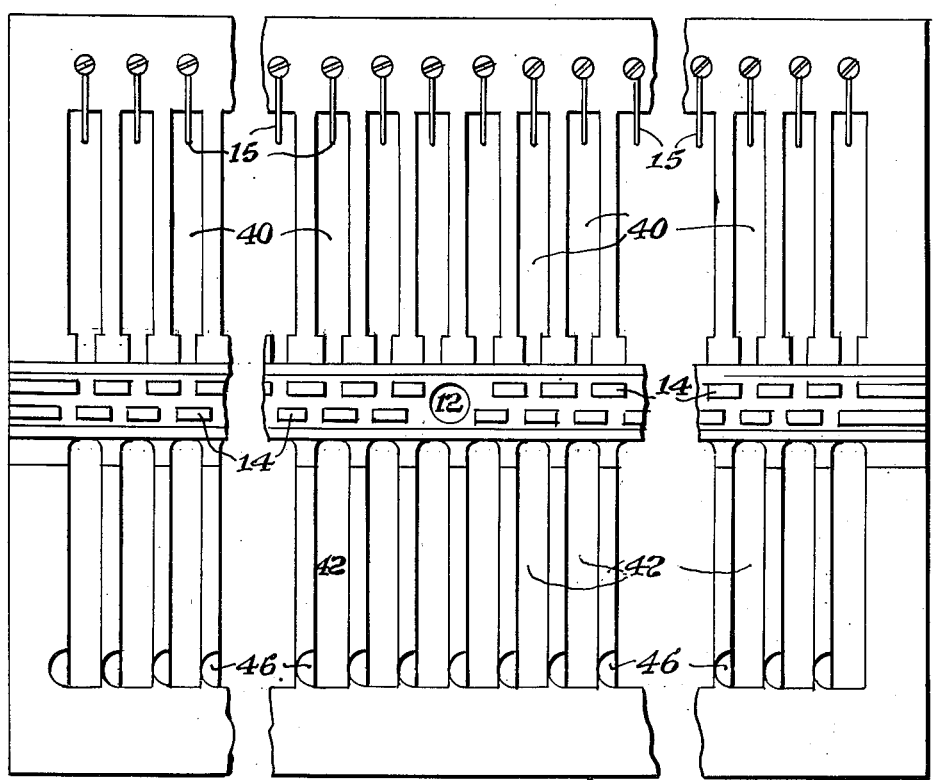
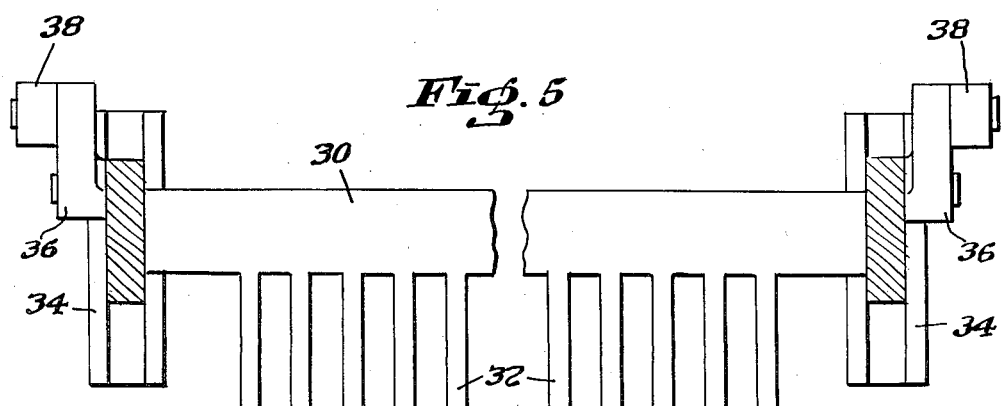
INVENTOR
CARL J. LIND
BY
ATTORNEY

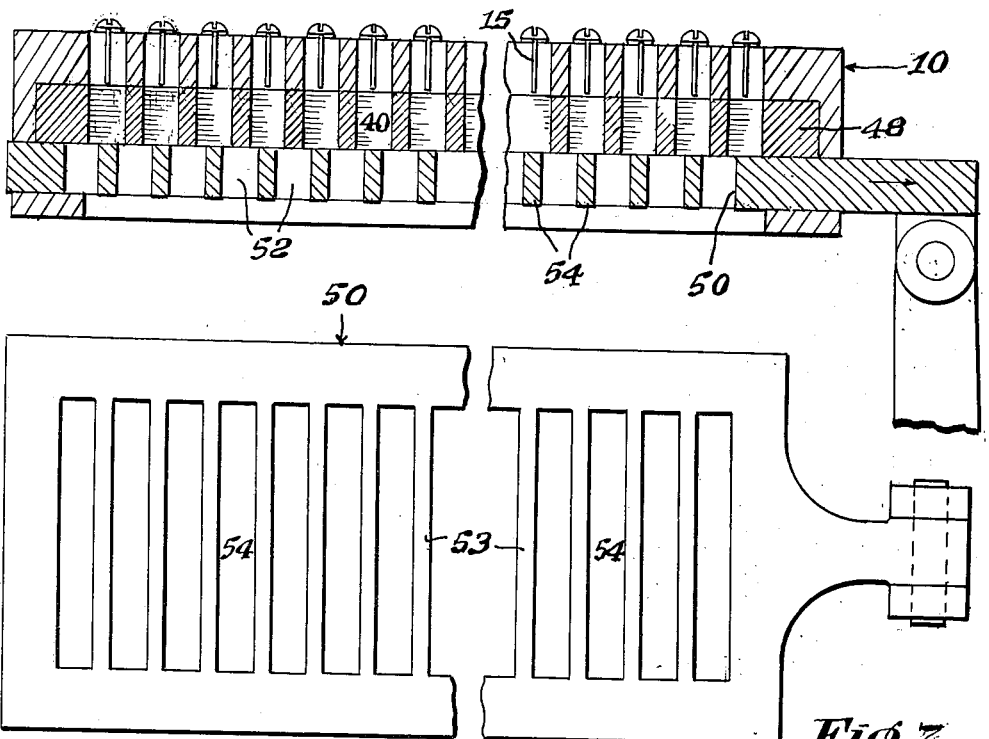
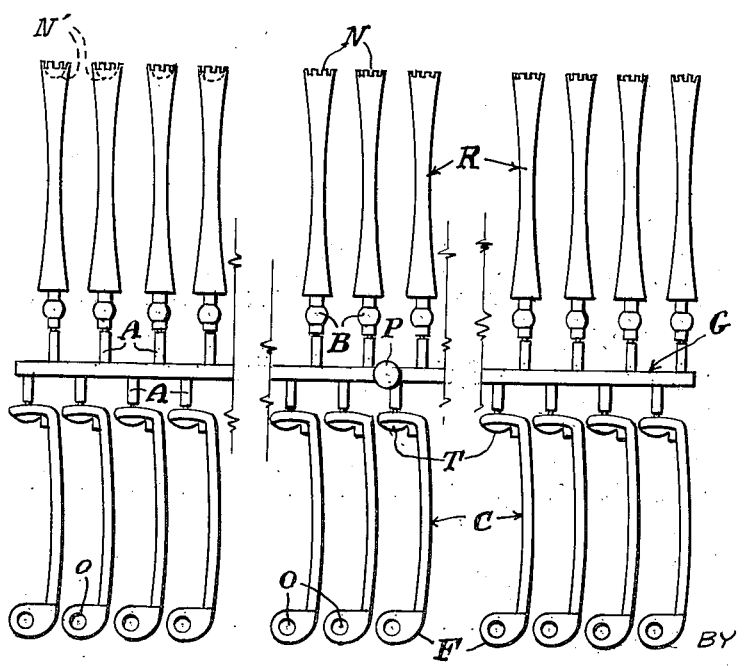

Patented Apr. 1, 1952

2,591,564

UNITED STATES PATENT OFFICE 2,591,564

MOLDING AND ASSEMBLING METHOD AND APPARATUS

Carl J. Lind, Skokie, Ill., assignor to Gillette Safety Razor Company, Boston, Mass., a corporation of Delaware Application March 18, 1950, Serial No. 150,466

8 Claims. (Cl. 18—1)

This invention relates to a method of forming and assembling molded articles having mating parts and to apparatus for use in practicing certain steps of the method.

In the manufacture of such articles heretofore, the mating parts have been molded separately, generally in multiple cavity molds, and subsequently assembled, usually by hand. Assembly has been a time-consuming and expensive operation and, further, in multiple cavity molding, has necessitated exact duplication of all the molding cavities of each mold, so that each part from one mold will fit every part from the other mold.

An object of this invention is to provide a novel method of molding and assembling the mating parts of such articles by which the assembling process is simplified and made capable of automatic machine operation, thereby substantially reducing the cost of manufacture. Another object is to provide a molding and assembling method in accordance with which a part from a given cavity of a first multiple cavity mold or mold section is invariably assembled with a part from a particular cavity of a second multiple cavity mold or mold section. Still another object of the invention is to provide a novel machine for performing the assembly steps of the process. Other objects and advantages of the invention will hereinafter appear.

According to the preferred practice of the method of the invention, the mating parts are molded in a single multiple cavity mold in which the differently shaped cavities for the two mating parts are arranged in predetermined opposite alignment. The aligned pairs of opposite cavities are connected to the source of fluid molding composition via corresponding feeder pairs fed from a common runner. On hardening, the molding composition in the feeders and runner serves to connect all the molded parts together and maintains the predetermined alignment of each pair of mating parts when the molded piece is removed from the mold.

The molded piece is maintained intact until the assembling operation. This operation involves severing the pairs of mating parts from the feeders at the points of the in-gates, moving the severed parts of each mating pair into juxtaposition along a path predetermined by their relative arrangement while connected to the runner and joining the juxtaposed parts. Since each part is invariably assembled with a mating part from a particular cavity in the opposite part of the mold, the preparation of the mold is greatly simplified, it being no longer necessary as heretofore to observe tolerances assuring interchangeability of the parts. Even with careful control of the tolerances, difficulties are not infrequently experienced under the prior practice where the parts must fit closely, because the rate of cooling of a filled mold or a "shot" is seldom uniform over its entire area, a fact making for differences in the extent of shrinkage of the parts ultimately sought to be mated.

To perform the assembling operation, the invention includes a machine having a cutting bed shaped to receive the molded piece comprising the runner and connected parts. As disposed on the cutting bed, the mating parts of each pair overlie individual receiving retainers arranged in accordance with the pattern of arrangement of the parts on the runner. The parts are severed at the in-gates by a cutting mechanism, preferably simultaneously, are received and held momentarily in the corresponding retainers, and are then moved along predetermined paths to bring each pair of mating parts into the position in which they are joined.

In the accompanying drawings, the process and apparatus of the invention, in their preferred forms, are illustrated as applied to the production of a hair curler composed of two molded mating parts. It will be understood, of course, that the curler shown in the drawings is merely illustrative of a general class of molded articles to the production of which the invention is applicable.

In the drawings:

Fig. 1 is a view, partly in vertical section, partly in side elevation, of assembly apparatus according to the invention, this view showing in full lines the runner and connected mating curler parts in an initial position preliminary to cutting and in dotted lines the position of the parts upon cutting;

Figs. 2 and 3 are vertical sectional views of part of the apparatus of Fig. 1, showing the position of parts upon completion of assembly and during discharge of the assembled curlers;

Fig. 4 is a top plan view, with portions broken away, of the cutting bed and retainers of the apparatus shown in Fig. 1;

Fig. 5 is a broken side elevation of the plunger mechanism of Fig. 1;

Fig. 6 is a longitudinal section on the line 6—6 of Fig. 2;

Fig. 7 is a top plan view of a slide mechanism forming part of the apparatus of Fig. 1;

Fig. 8 is a broken plan view showing the molded piece comprising the curler parts as it comes from the mold;

Fig. 9 is a view of the assembled curler.

Referring now to the drawings, and first to Figs. 3, 8 and 9, the curler to be molded and assembled by the process and apparatus as illustrated, is shown assembled in Fig. 3 and again in Fig. 9 and consists of a rod R and clasp C which are molded as separate parts of any suitable material such as polystyrene. The rod has at one end an extension on which is formed a ball B and at the other end a series of marginal notches N which surround the mouth of a recess or socket N'. The clasp has at one end a pair of opposed laterally yieldable flanges F having aligned openings O providing a socket receiving the ball B which is pressed thereinto to form a swivel joint. The opposite end of the clasp is hooked and is provided with an inwardly projecting tab T which is received in the socket N' and held against rotary movement by the notches N. In use of the curler, tab T is freed from the socket N' of the rod by pulling the hook portion of the clasp, the rod being thereafter freely rotatable about its own axis in the hair-winding or curl-forming operation. Once the curl is formed the tab T is re-inserted into the socket N' to lock the curl against unwinding.

Although, as indicated, assembly of the two parts R and C in working relation is completed merely by pressing the ball B between flanges F into the socket O, for convenience in packaging I prefer to couple them at their opposite ends as well.

In accordance with the preferred practice of the method of the invention and as shown in Fig. 8, the mating parts R and C of the device are molded in a single multiple cavity mold in which the feed lines are arranged to provide a runner G and feeders A connecting all of the parts together in predetermined relation. As shown, the runner has a tubular projection P corresponding to the mold gate and each feeder is attached to one of the parts R or C, uniformly spaced along the opposite sides of the runner.

It will be observed that the body portion of each part C is substantially aligned with the axis of a part R but that the feeders stand in a staggered relation. This arrangement of the feeders is not an essential or critical feature of the invention, but coincides with the arrangement of parts in the particular assembling apparatus shown in the drawings and to be hereinafter described.

The mold normally used to produce the integral structure of Fig. 8 is of the injection type. While the cavities therein which correspond to the parts R and C are formed to tolerances providing for close interfitting of the parts, these tolerances need not be uniform over the mold, as any part needs only to fit its opposite mating part. The resultant relative simplicity of forming the molds is, as previously stated, one of the substantial advantages of the invention.

In the molding operation, the opening between the two flanges F of the part C and the notches N may be formed in a manner well understood in the art by means of retractable slides. Feeders A are so formed that they are of reduced cross-section at the points of juncture with the curler parts, the subsequent severing of the parts being thereby facilitated. These points of reduced cross-section correspond with the in-gate portions of the mold.

Referring now particularly to Figs. 1 and 4 illustrating the essential parts of the apparatus employed in the assembling of the curler parts, loading of the apparatus is accomplished simply by depositing the molded piece or "shot" on the bed 10 which presents a recess 12 receiving the projection P on the runner, registry means in the form of lugs 14 between which the feeders A are received and elements 15 which lend support to the notched ends of the rods R.

Positioned above the bed 10, more particularly over the runner and feeder portion 9 thereof, is a plunger bar 16, extending the length of the bed and vertically reciprocal in end guideways 18 and 20, having cutting edges 22 spaced in correspondence with the distance between the attenuated end portions of the opposed feeders A and cooperating with like edges on portion 9. This plunger is actuated as by mechanical or fluid pressure means, not shown, through levers 24 at either end thereof fulcrumed at 26 and connected to the plunger via linkages 28.

Also extending the length of the bed 10, is a second plunger member 30 having fingers 32 (see Fig. 5) corresponding in number to the rods R. Plunger 30 is mounted to reciprocate in the right hand channels of guideways 20 (Fig. 1) and in a third pair of guideways 34, these, like guideways 20, being positioned one at either end of the plunger. Actuation of the plunger 30 is accomplished through a pair of levers 38, each of which is connected to the plunger at one end thereof through a linkage 36.

On severing of the parts R and C from the feeders by the edges 22 of the cutting plunger, the severed parts fall into retaining cavities 40 and 42, respectively. Parts C, as they descend, turn axially through an angle of 90°, this being due to the fact that the main body of each of said parts lies forwardly of the corresponding cavity 46 in which the flanges F are received. Rods R are prevented from rotating or from becoming longitudinally displaced as they fall into the cavities 40 by the elements 15 which continue to be embraced by the notched ends of the rods. In Fig. 1 the positions of the two parts of the curler following the cutting or severing is indicated in dot and dash lines.

It is to be clearly understood that it is within the scope of my invention to form the mating parts using separate multiple cavity molds providing unitary molded pieces such as would be formed by splitting or severing the structure of Fig. 8 along the line of the axis of the runner G.

Cavities 40 in which the parts R are received and retained have a common bottom in the form of the right hand portion (Fig. 1) of a lever-actuated slide 48. The left hand portion of this slide has the form of a grate, the grate openings forming the lower half of the sides and ends of the cavities 42. Slide 48 overlies a second lever-actuated slide 50 which works at right angles to the slide 48 in a guideway provided in part by the plate 52 representing the common bottom of the cavities 42. This slide, as shown in Fig. 7, has the form of a grate throughout its length. Partitions 53 between the grate openings 54 in slide 50 undersupport parts C as they are carried under the parts R by the slide 48 and undersupport both parts during the snapping of the two together by the plunger fingers 32 (Fig. 2). It is to be observed that the spacing between the depending ends of the elements 15 and the upper surfaces of the tabs T of the clasp members, as represented in Fig. 2, is such that as the rods are forced downwardly by the plunger fingers, the tabs become embraced within the notches N before the rods lose contact with these elements. This arrangement effectively avoids any possibility of lateral displacement or rotation of the rods.

To release the assembled curler, slide 50 is moved so that the openings 54 are brought into registry with the corresponding openings of the upper slide 48 and the plunger fingers 32 forced further downwardly, this action assuring positive discharge of the curler.

It is understood that the invention in its apparatus aspects will not be considered as restricted to the details of construction shown in the drawings, since various changes and modifications, such as those dictated by practical considerations including the form of the pieces to be assembled, may obviously be made without departing from the scope of the invention or sacrificing the advantages derived from its use.

Having thus described and illustrated my invention, what I claim is:

1. The method of molding and assembling together pairs of mating parts in multiple which comprises molding and hardening said parts in groups of non-mating parts in a manner whereby the parts in each group are linked together by excess hardened molding material in proper spaced relation for joining with the parts in the other group, each part of one group being dimensioned complementarily with relation to a particular part in the other group, severing the parts from the excess molding material while maintaining each part in a predetermined relation with respect to its complementary part, juxtaposing the severed parts for assembly and joining the juxtaposed parts.

2. The method of molding and assembling together, in multiple, pairs of mating parts, which comprises molding and hardening a plurality of pairs of said parts in a manner to provide a continuous portion of hardened molding composition extending between and uniting said pairs of parts together in a single structure with the parts of each pair held in predetermined opposite alignment, cutting said parts from said portion while maintaining a uniform opposite alignment of the parts of said pairs, relatively moving said aligned parts to juxtapose the parts of each pair into proper position for assembly, and pressing said juxtaposed parts together.

3. The method of molding and assembling together, in multiple, pairs of mating parts, which comprises molding and hardening a set of one of said parts in a manner to provide a continuous portion of hardened molding composition extending between and uniting said parts in a predetermined relation, molding and hardening a corresponding set of the other said parts in like manner to provide a continuous portion of hardened molding composition extending between and uniting said parts in a predetermined corresponding relation, each part of one set being dimensioned to fit a particular corresponding part of the other said set, positioning said sets together for cutting with each part of one set held by its uniting portion in predetermined alignment with said particular part of the other said set which it is dimensioned to fit, severing said parts of each set from the uniting portion while preserving said alignment, relatively moving said aligned parts to juxtapose said parts for assembly, and pressing said juxtaposed parts together.

4. The method of molding and assembling together, in multiple, pairs of mating parts, which comprises forming a unitary mold structure including a runner portion and all of the parts to be assembled, these being individually linked to the runner through feeders with the mating parts aligned in spaced relation on opposite sides of the runner, simultaneously severing the parts from the feeders while maintaining said structure on a generally horizontal plane and while maintaining the opposite alignment of the parts, simultaneously shifting all of the parts which had been attached at one side of the runner under the parts which had been attached at the other side of the runner and joining the parts by forcing the last said parts downwardly into engagement with the other of said parts.

5. In the manufacture of molded plastic hair curlers of the type comprising a rod member and a clasp member adapted to be snapped together, the method of molding and assembling the members in multiple which comprises forming a unitary mold structure including a runner portion and all of the members to be assembled, these being individually linked in spaced relation to the runner through feeders with the rod members aligned on one side of the runner and the clasp member on the other, simultaneously severing the members from the feeders while maintaining said structure on a generally horizontal plane and while maintaining the opposite alignment of the members, simultaneously shifting all of the members which had been attached at one side of the runner under the members which had been attached at the other side of the runner and simultaneously snapping the members together by forcing the last said members downwardly into engagement with the other of said members.

6. Apparatus for assembling pairs of mating parts in multiple comprising a bed portion adapted to receive a unitary structure comprising the pairs of parts and a body portion to which the parts are individually linked in spaced relation with the mating parts on opposite sides in predetermined alignment, individual retainer means at a level below the level of the unitary structure as deposited on the bed, said retainer means being spaced and arranged as determined by the spacing and arrangement of the mating parts in said unitary structure, the retainers corresponding to the parts on one side of said body portion being of a depth greater than the other retainers, means for so severing the parts from said body portion that the parts are caught by said individual retainer means, means for juxtaposing the severed parts for assembly and means for pressing the juxtaposed parts together.

7. Apparatus for assembling pairs of molded mating parts in multiple comprising a bed portion adapted to receive a unitary molded structure comprising the pairs of parts and a runner portion to which the parts are individually linked in spaced relation through feeders with the mating parts on opposite sides of the runner in predetermined alignment, individual retainer means at a level below the level of the unitary structure as deposited on the bed, said retainer means being spaced and arranged as determined by the spacing and arrangement of the mating parts in said unitary structure, the retainers corresponding to the parts on one side of said runner portion being of a depth greater than the other retainers, plunger means for simultaneously severing the parts from said feeders so that the parts are caught by said individual retainer means, means for maintaining the said predetermined opposite alignment during the severing, slide means for juxtaposing the severed parts for assembly and means for pressing the juxtaposed parts together.

8. Apparatus for assembling pairs of molded mating parts in multiple comprising a horizontal bed portion adapted to receive a unitary molded structure comprising the pairs of parts and a runner portion to which the parts are individually linked in spaced relation through feeders with the mating parts on opposite sides of the runner in predetermined alignment, individual retainer means at a level below the level of the unitary structure as deposited on the bed, said retainer means being spaced and arranged as determined by the spacing and arrangement of the mating parts in said unitary structure, the retainers corresponding to the parts on one side of said runner being of a depth greater than the other retainers, plunger means for simultaneously severing the parts from said feeders so that the parts are caught by said individual retainer means, means for maintaining the said predetermined opposite alignment during the severing, slide means for shifting the parts received in the deeper retainers under the parts received in the other retainers, plunger means for forcing the parts in the last-mentioned retainers into engagement with the parts shifted from the deeper retainers and separate slide means for releasing the assembled parts from the apparatus.

CARL J. LIND.

REFERENCES CITED

The following references are of record in the file of this patent:

UNITED STATES PATENTS

| Number | Name | Date |
|---|---|---|
| 611,714 | Smith et al. | Oct. 4, 1898 |
| 2,303,748 | Lange | Dec. 1, 1942 |